United States Patent
Jung et al.

(10) Patent No.: US 9,189,397 B2
(45) Date of Patent: Nov. 17, 2015

(54) DATA STORAGE DEVICE INCLUDING BUFFER MEMORY

(71) Applicant: SK hynix Inc., Gyeonggi-do (KR)

(72) Inventors: Jong Pil Jung, Gyeonggi-do (KR);
Young Ho Kim, Gyeonggi-do (KR);
Young Kyun Shin, Gyeonggi-do (KR);
Duck Hoi Koo, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 210 days.

(21) Appl. No.: 13/720,221

(22) Filed: Dec. 19, 2012

(65) Prior Publication Data

US 2014/0101386 A1    Apr. 10, 2014

(30) Foreign Application Priority Data

Oct. 4, 2012  (KR) .................. 10-2012-0110017

(51) Int. Cl.
*G06F 12/00* (2006.01)
*G06F 12/08* (2006.01)
*G06F 3/06* (2006.01)

(52) U.S. Cl.
CPC ............ *G06F 12/0802* (2013.01); *G06F 3/061* (2013.01); *G06F 3/0656* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 5,603,062 | A * | 2/1997 | Sato et al. | 711/100 |
| 6,378,051 | B1 * | 4/2002 | Henson et al. | 711/151 |
| 2005/0169061 | A1 * | 8/2005 | Sohn et al. | 365/189.03 |
| 2009/0113087 | A1 * | 4/2009 | Kohinata et al. | 710/60 |
| 2010/0030947 | A1 * | 2/2010 | Moon et al. | 711/103 |
| 2010/0217927 | A1 * | 8/2010 | Song et al. | 711/103 |
| 2010/0229032 | A1 * | 9/2010 | Lee | 711/103 |
| 2010/0287333 | A1 * | 11/2010 | Lee et al. | 711/103 |
| 2010/0318754 | A1 * | 12/2010 | Park et al. | 711/156 |
| 2012/0221771 | A1 * | 8/2012 | Yoon et al. | 711/103 |
| 2012/0246392 | A1 * | 9/2012 | Cheon | 711/103 |

FOREIGN PATENT DOCUMENTS

| | | |
|---|---|---|
| KR | 1020050078206 | 8/2005 |
| KR | 1020090045085 | 5/2009 |
| KR | 1020100012468 | 2/2010 |

* cited by examiner

*Primary Examiner* — Aimee Li
*Assistant Examiner* — Jason Blust
(74) *Attorney, Agent, or Firm* — IP & T Group LLP

(57) ABSTRACT

A data storage device includes a data storage medium; a micro control unit (MCU) connected to a host through a first interface method and configured to control the data storage medium in response to a request of the host; and a buffer memory connected to the host through a second interface method, connected to the MCU, and controlled by the MCU and the host, respectively.

18 Claims, 7 Drawing Sheets

| Priority | Current Master | Access Request | Changed Master |
|---|---|---|---|
| MCU | Host | MCU | MCU |
| Host | MCU | Host | Host |
| MCU & Host Equal | MCU | Host | MCU |
| | Host | MCU | Host |

DATA STORAGE DEVICE INCLUDING BUFFER MEMORY

CROSS-REFERENCES TO RELATED APPLICATION

The present application claims priority under 35 U.S.C. §119(a) to Korean application number 10-2012-0110017, filed on Oct. 4, 2012, in the Korean Intellectual Property Office, which is incorporated herein by reference in its entirety.

BACKGROUND

1. Technical Field

Exemplary embodiments of the present invention relate to a data storage device, and more particularly, to a data storage device sharing a buffer memory with a host.

2. Related Art

Recently, the computing environment has become ubiquitous in which computer systems are used anytime and anywhere. Accordingly, the use of portable electronic devices such as mobile phones, digital cameras, and notebook computers has rapidly increased. In general, such a portable electronic device includes a data storage device using memory devices. The data storage device is used as a main memory device or auxiliary memory device of the portable electronic device.

The data storage device using memory devices has no mechanical driver. Thus, the data storage device has excellent stability and durability, exhibits high information access speed, and has small power consumption. The data storage device having such advantages may include a universal serial bus (USB) memory device, a memory card having various interfaces, a solid state drive (SSD) and the like.

As more and more large files such as music files and video files are reproduced in portable electronic devices, the data storage device is required to have a large storage capacity. The data storage device often includes a plurality of memory devices to increase the storage capacity. In the data storage device with a plurality of memory devices, a high operating speed as well as a large storage capacity are important characteristics of the data storage device.

The data storage device may use a buffer program method to improve the operating speed. In order to use the buffer program method, the data storage device may include a buffer memory. The buffer memory is configured to buffer data transmitted between a host and data storage media (that is, memory devices). Furthermore, the buffer memory may temporarily store metadata required for driving the data storage device.

SUMMARY

Exemplary embodiments of the present invention are directed to provide a data storage device sharing a buffer memory with a host.

In accordance with an embodiment of the present invention, a data storage device may include a data storage medium, a micro control unit (MCU) connected to a host through a first interface method and configured to control the data storage medium in response to a request of the host, and a buffer memory connected to the host through a second interface method, connected to the MCU, and controlled by the MCU and the host, respectively.

In accordance with another embodiment of the present invention, a data storage device may include a data storage medium, a buffer memory configured to buffer data to be stored in the data storage medium or data read from the data storage medium, and an MCU configured to control the data storage medium and the buffer memory, wherein the buffer memory is shared by the MCU and a host, and accessed by the host without intervention of the MCU.

In accordance with still another embodiment of the present invention, a solid state drive (SSD) may include a plurality of NAND flash memory devices, a SSD controller connected to a host through a first interface method and configured to control the plurality of NAND flash memory devices in response to a request of the host, and a non-volatile RAM configured to operate as a buffer memory, connected to the host through a second interface method, connected to the SSD controller, and controlled by the SSD controller and the host, respectively.

BRIEF DESCRIPTION OF THE DRAWINGS

Features, aspects, and embodiments are described in conjunction with the attached drawings, in which.

DETAILED DESCRIPTION

Hereinafter, a data storage device according to the present invention will be described below with reference to the accompanying drawings through exemplary embodiments.

The drawings are not necessarily to scale and in some instances, proportions may have been exaggerated in order to clearly illustrate features of the embodiments. In this specification, specific terms have been used. The terms are used to describe the present invention, and are not used to qualify the sense or limit the scope of the present invention.

In this specification, 'and/or' represents that one or more of components arranged before and after 'and/or' is included. Furthermore, 'connected/coupled' represents that one component is directly coupled to another component or indirectly coupled through another component. In this specification, singular form may include a plural form as long as it is not specifically mentioned in a sentence, Furthermore, 'include/comprise' or 'including/comprising' used in the specification represents that one or more components, steps, operations, and elements exists or are added.

Figure 1:
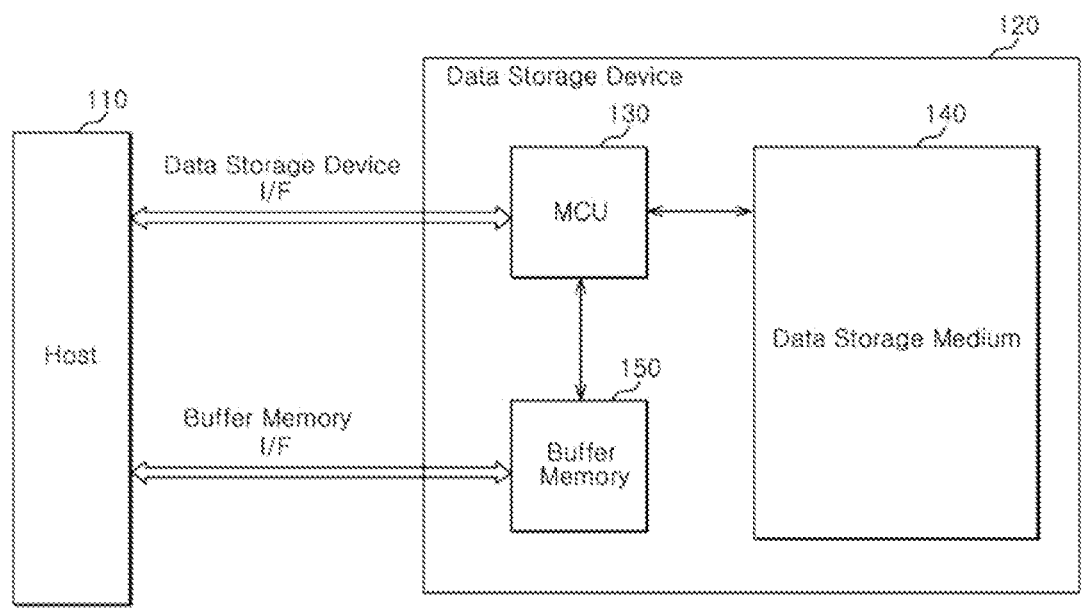
FIG. 1 is a block diagram illustrating a data processing system including a data storage device according to an embodiment of the present invention.

FIG. 1 is a block diagram illustrating a data processing system including a data storage device according to an embodiment of the present invention. Referring to FIG. 1, the data processing system 100 includes a host 110 and a data storage device 120.

The host 110 includes portable electronic devices such as a mobile phone and an MP3 player or electronic devices such as a laptop computer, a game machine, a TV, and a beam projector.

The data storage device 120 is configured to operate in response to a request of the host 110. The data storage device 120 is configured to store data accessed by the host 110. That is, the data storage device 120 may be used as a main memory device or secondary memory device of the host 110. The data storage device 120 includes a micro control unit (MCU) 130, a data storage medium 140, and a buffer memory 150.

The MCU 130, the data storage medium 140, and the buffer in memory 150 may be configured as a memory card connected to the host 110 through various interfaces. Alternatively, the MCU 130, the data storage medium 140, and the buffer memory 150 may be configured as a solid state drive (SSD).

The MCU 130 is configured to control overall operations of the data storage device 120. For this operation, the MCU 130 is configured to drive a firmware. The MCU 130 may load management information required for driving the firmware into the buffer memory 150, and drive the firmware by referring to the loaded management information.

The MCU 130 is configured to control the data storage medium 140 in response to a request from the host 100. For example, the MCU 130 is configured to provide data read from the storage medium 140 to the host 110. As another example, the MCU 130 is configured to store data provided from the host 110 to the data storage medium 140. For this operation, the MCU 130 is configured to control read, program (or write), and erase operations of the data storage medium 140. For the data storage medium 140, the MCU 130 may be recognized as a second host to control the data storage medium 140 according to the control of the host 110.

The MCU 130 may buffer data transmitted from the data storage medium 140 to the host 110, in order to quickly respond to a request of the host 110. Furthermore, the MCU 130 may buffer data transmitted from the host 110 to the data storage medium 140, in order to quickly respond to a response of the host 110. Such a data buffering operation is performed by the buffer memory 150.

As described above, the buffer memory 150 is configured to buffer data according to the control of the MCU 130. Furthermore, the buffer memory 150 is configured to store a part or all of management information of the firm are driven by the MCU 130. The buffer memory 150 is connected to the host 110 through a buffer memory interface for interfacing the buffer memory 150 and the host 110. Therefore, the host 110 may directly access the buffer memory 150. This means that the host 110 may store data in the buffer memory 150 and read data from the buffer memory 150 without intervention of the MCU 130.

The buffer memory interface is physically and logically distinguished from a data storage device interface for interfacing the data storage device 120 and the host 110. That is, the buffer memory interface may be configured through a signal line distinguished from the data storage device interface. Furthermore, the buffer memory interface may be configured through an interface protocol distinguished from the data storage device interface.

For example, the data storage device interface may include one of various interface protocols such as a universal serial bus (USB) protocol, a multi-media card (MMC) protocol, a peripheral component interconnection (PCI) protocol, a PCI-express (PCI-E) protocol, a parallel advanced technology attachment (DATA) protocol, a serial ATA (SATA) protocol, an small computer system interface (SCSI) protocol, and an integrated drive electronics (IDE) protocol.

For example, the buffer memory 150 may include any one of various volatile memory devices such as static random access memory (SRAM), dynamic random access memory (DRAM), and synchronous DRAM (SDRAM). As another example, the buffer memory 150 may include any one of various nonvolatile memory devices such as a NOR flash memory device, a NAND flash memory device, a ferroelectric RAM (FRAM) using a ferroelectric capacitor, a magnetic RAM (MRAM) using a tunneling magneto-resistive (TMR) layer, a phase change memory device (PRAM) using chalcogenide alloys, and a resistive memory device (ReRAM) using transition metal oxide. The buffer memory interface may include an interface protocol corresponding to the type of the buffer memory 150.

Figure 2:
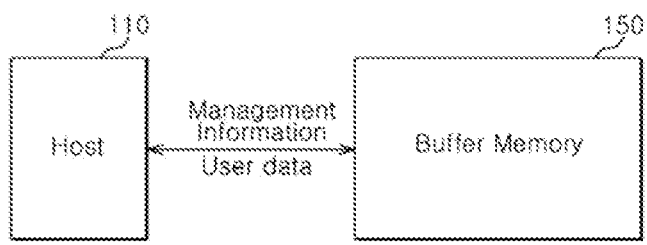
FIG. 2 is a block diagram illustrating the operation of a host sharing a buffer memory of the data storage device according to the embodiment of the present invention.

FIG. 2 is a block diagram illustrating the operation of the host sharing the buffer memory of the data storage device according to the embodiment of the present invention. The host 110 is connected to the buffer memory 150 through the buffer memory interface. The host 110 may store data in the buffer memory 150, and read data from the buffer memory 150.

For example, the host 110 may update management information of the data storage device 120 of FIG. 1, Here, the management information includes data related to the firmware driven by the MCU 130. For example, the management information may include a source code required for driving the firmware, address mapping data for mapping an address provided from the host 110 with an address of the data storage medium 140, metadata for managing data stored in the data storage medium 140, and records related to data transmission between the host 110 and the data storage device 120 (for example, transaction information), As another example, the host 110 may directly store user data, which is to be stored in the data storage medium 140 of FIG. 1, in the buffer memory 150. The user data may include hot data that are frequently accessed.

After updating the management information or user data into the buffer memory 150 without intervention of the MCU 130, the host 110 may inform the MCU 130 that the management information or user data was updated.

Figures 3, 4:
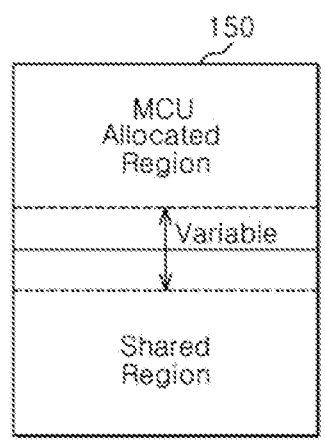
FIG. 3 is a table for explaining master devices having an access right to the buffer memory of the data storage device according to the embodiment of the present invention.
FIG. 4 is a diagram illustrating region division of the buffer memory of the data storage device according to the embodiment of the present invention.

FIG. 3 is a table for explaining master devices having an access right to the buffer memory of the data storage device according to the embodiment of the present invention. The buffer memory 150 of FIG. 1 is shared by the host 110 and the MCU 130. The host 110 and the MCU 130, which access the buffer memory 130, may be referred to as master devices, and the buffer memory 150 accessed by the master devices (that is, the host 110 and the MCU 130) may be referred to as a slave device.

Suppose that the priority of the MCU 130 to access the buffer memory 150 is higher than that of the host 110. In this case, although the host 110 currently accesses (or occupies) the buffer memory 150, the MCU 130 may access (or occupy) the buffer memory 150 according to the priority, when the MCU 130 requests an access to the buffer memory 150.

Suppose that the priority of the host 110 to access the buffer memory 150 is higher than that of the MCU 130, In this case, although the MCU 130 currently accesses (or occupies) the buffer memory 150, the host 110 may access (or occupy) the buffer memory 150 according to the priority, when the host 110 requests an access to the buffer memory 150.

Suppose that the priority of the MCU 130 to access the buffer memory 150 is equal to that of the host 110. In this case, the access (or occupation) right may be maintained until the access (occupation) of the master device accessing the buffer memory 150 is ended.

In order to access the buffer memory 150 according to the priority, the MCU 130 and the host 110 may exchange information related to access of the buffer memory 150, for example, access request information, current access state information and the like.

FIG. 4 is a diagram illustrating region division of the buffer memory of the data storage device according to the embodiment of the present invention. Referring to FIG. 4, the region of the buffer memory 150 shared by the MCU 130 and the host 110 of FIG. 1 may be varied. For example, the whole region of the buffer memory 150 may be shared by the MCU 130 and the host 110. As another example, a part of the region of the buffer memory 150 may be allocated to the MCU 130, and the other part of the region may be shared by the MCU 130 and the host 150.

In order to share the region of the buffer memory 150, the MCU 130 and the host 110 may be exchange information related to the shared region of the buffer memory 150, for example, shared region addresses and the like.

Figure 5:
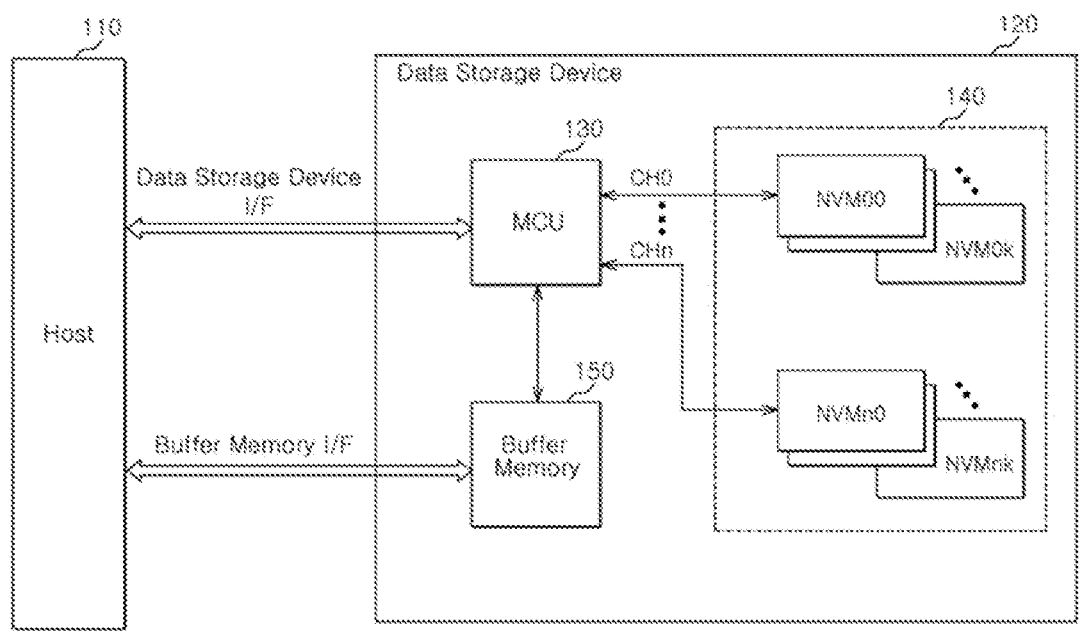
FIG. 5 is a block diagram illustrating a data storage medium of the data storage device according to the embodiment of the present invention.

FIG. 5 is a block diagram illustrating the data storage medium of the data storage device according to the embodiment of the present invention. The data storage medium 140 includes a plurality of nonvolatile memory devices NVM00 to NVM0k and NVMn0 to NVMnk. The nonvolatile memory devices NVM00 to NVM0k and NVMn0 to NVMnk are connected to the MCU 130 through channels CH0 to CHn. The MCU 130 may operate the channels CH0 to CHn in parallel. For example, the MCU 130 may control an interleaving operation between the channels CH0 to CHn. Furthermore, the MCU 130 may operate the nonvolatile memory devices NVM00 to NVM0k, . . . , or NVMn0 to NVMnk connected to one channel CH0, . . . , or CHn in parallel. For example, the MCU 130 may control an interleaving operation between the nonvolatile memory devices NVM00 to NVM0k, . . . , or NVMn0 to NVMnk.

Each of the nonvolatile memory devices NVM00 to NVM0k and NVMn0 to NVMnk may include any one of various nonvolatile memory devices such as a NAND flash memory device, a NOR flash memory device, a ferroelectric RAM (FRAM) using a ferroelectric capacitor, a magnetic RAM (MRAM) using a tunneling magneto-resistive (TMR) layer, a phase change memory device (PRAM) using chalcogenide alloys, and a resistive memory device (RERAM) using transition metal oxide.

Figure 6:
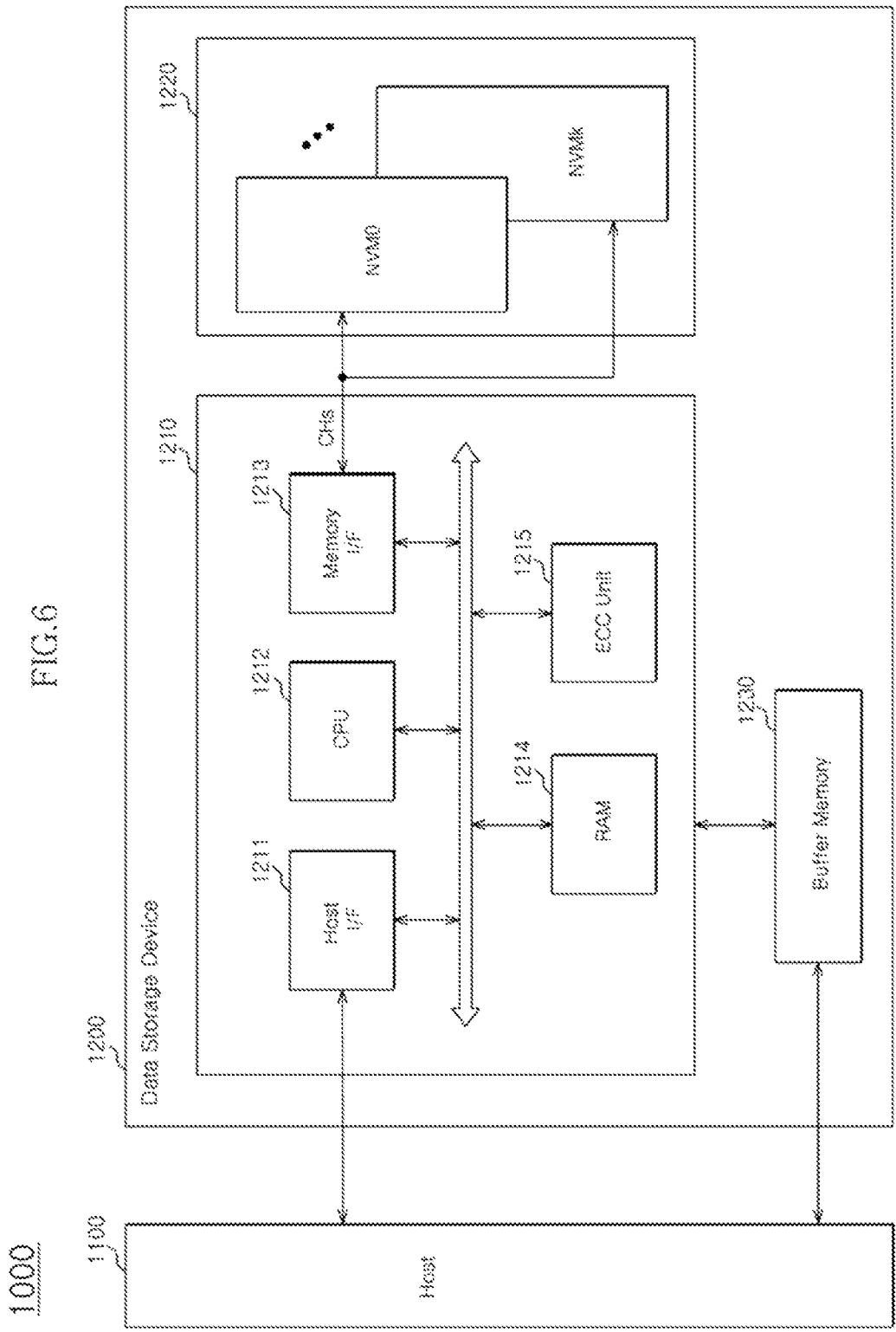
FIG. 6 is a block diagram illustrating a data processing system according to another embodiment of the present invention.

FIG. 6 is a block diagram illustrating a data processing system according to another embodiment of the present invention, Referring to FIG. 6, the data processing system 1000 includes a host 1100 and a data storage device 1200. The data storage device 1200 includes a controller 1210, a data storage medium 1220, and a buffer memory, 1230. The data storage device 1200 may be connected to the host 1100 such as a desktop computer, a notebook computer, a digital camera, a mobile phone, an MP3 player, a game machine or the like. The data storage device 1200 is also referred to as a memory system.

The controller 1210 is coupled to the host 1100 and the data storage medium 1220. The controller 1210 is configured to access the data storage medium 1220 in response to a request from the host 1100. For example, the controller 1210 is configured to control a read, program, or erase operation of the data storage medium 1220. The controller 1210 is configured to drive a firmware for controlling the data storage medium 1220.

The buffer memory 1230 is connected to the controller 1210. The buffer memory 1230 is configured to store management information of the firmware driven by the controller 1210. The buffer memory 1230 is configured to buffer data transmitted between the host 1100 and the data storage medium 1220. The buffer memory 1230 is directly connected to the host 1100 through a buffer memory interface. The controller 1210 and the host 1100 may share the buffer memory 1230.

The controller 1210 may include well-kn n components such as a host interface 1211, a central processing unit (CPU) 1212, a memory interface 1213, a RAM 1214, and an error correction code (ECC) unit 1215.

The CPU 1212 is configured to control overall operations of the controller 1210 in response to a request from the host. The RAM 1214 may be used as a working memory of the CPU 1212. The RAM 1214 may temporarily store data read from the data storage medium 1220 or data provided from the host 1100.

The host interface 1211 is configured to interface the host 1100 and the controller 1210. For example, the host interface 1211 may be configured to communicate with the host 1100 through one of various interface protocols such as a USB protocol, a MMC protocol, a PCI protocol, a PCI-E protocol, a PATA protocol, a SATA protocol, a SCSI protocol, and an IDE protocol.

The memory interface 1213 is configured to interface the controller 1210 and the data storage medium 1220. The memory interface 1213 is configured to provide a command and address to the data storage medium 1220. Furthermore, the memory interface 1213 is configured to exchange data with the data storage medium 1220.

The ECC unit 1215 is configured to detect an error of the data read from the data storage medium 1220. Furthermore, the ECC unit 1215 is configured to correct the detected error, when the detected error falls within a correction range. Meanwhile, the ECC unit 1215 may be provided inside or outside of the controller 1210 depending on the memory system 1000.

The controller 1210 and the data storage medium 1220 may be configured as a solid state drive (SSD). As another example, the controller 1210 and the data storage medium 1220 may be integrated into one semiconductor device to form a memory card.

For example, the controller 1210 and the data storage medium 1220 may be integrated into one semiconductor device to form a personal computer memory card international association (PCMCIA) card, a compact flash (CF) card, a smart media card, a memory stick, a multi-media card (MMC, RS-MMC, or MMC-micro), a secure digital (SD) card (SD, Mini-SD, or Micro-SD), or a universal flash storage (UFS) card.

As another example, the controller 1210 or the data storage medium 1220 may be mounted in various types of packages. For example, the controller 1210 or the data storage medium 1220 may be packaged and mounted according to various methods such as POP (package on package), ball grid arrays (BGAs), chip scale package (CSP), plastic leaded chip carrier (PLCC), plastic dual in-line package (PDIP), die in waffle pack, die in wafer form, chip on board (COB), ceramic dual in-line package (CERDIP), plastic metric quad flat package (MQFP), thin quad flat package (TQFP), small outline IC (SOIC), shrink small outline package (SSOP), thin small outline package (TSOP), thin quad flat package (TQFP), system in package (SIP), multi chip package (MCP), wafer-level fabricated package (WFP), and wafer-level processed stack package (WSP).

Figure 7:
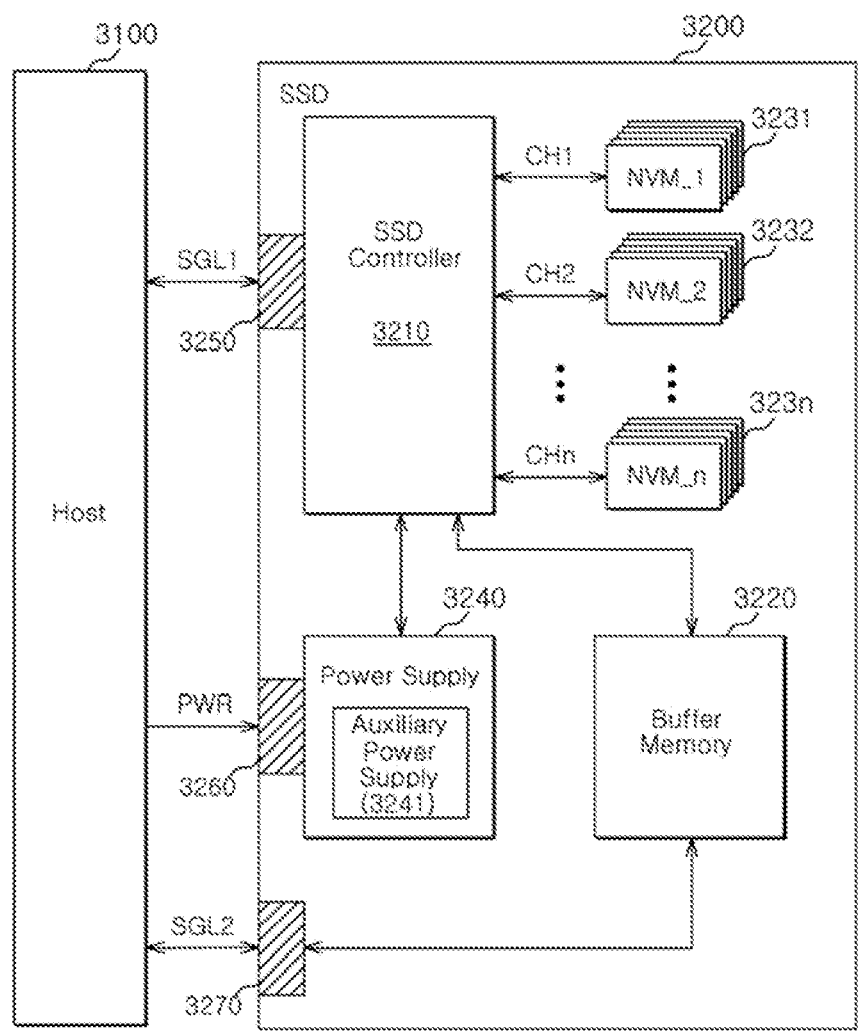
FIG. 7 is a block diagram illustrating a solid state drive (SSD) according to the embodiment of the present invention.

FIG. 7 is a block diagram illustrating an SSD according to the embodiment of the present invention. Referring to FIG. 7 a data processing system 3000 includes a host 3100 and an SSD 3200.

The SSD 3200 includes an SSD controller 3210, a buffer memory, 3220, a plurality of nonvolatile memory devices 3231 to 323n, a power supply 3240, a first signal connector 3250, a power connector 3260, and a second signal connector 3270.

The SW 3200 operates in response to a request of the host 3100. That is, the SSD controller 3210 is configured to access the nonvolatile memory devices 3231 to 323n in response to a request from the host 3100. For example, the SSD controller 3210 is configured to control read, program, and erase operations of the nonvolatile memory devices 3231 to 323n.

The buffer memory 3220 is configured to temporarily store data, which are to be stored in the nonvolatile memory devices 3231 to 323n. Furthermore, the buffer memory 3220 is configured to temporarily store data read from the nonvolatile memory devices 3231 to 323n. The data temporarily stored in the buffer memory 3220 are transmitted to the host 3100 or the nonvolatile memory devices 3231 to 323n, according to the control of the SSD controller 3210.

The buffer memory 3220 is configured to exchange signals SGL2 with the host 3100 through the second signal connector 3270. The signals SGL2 may include a command, an address, data and the like. The second connector 3270 may be configured according to the interface method between the host 3100 and the buffer memory 3220. The SSD controller 3210 and the host 3100 may share the buffer memory 3220.

The nonvolatile memory devices 3231 to 323n are used as storage media of the SSD 3200. The nonvolatile memory devices 3231 to 323n are connected to the SSD controller 3210 through a plurality of channels CH1 to CHn, respectively. One channel may be connected to one or more nonvolatile memory devices. The nonvolatile memory devices connected to one channel may be connected to the same signal bus and data bus.

The power supply 3240 is configured to provide power PWR inputted through the power connector 3260 into the SSD 3200. The power supply 3240 includes an auxiliary power supply 3241. The auxiliary power supply 3241 is configured to supply power to normally terminate the SSD 3200, when sudden power off occurs. The auxiliary power supply 3241 may include super capacitors configured to store the power PWR.

The SSD controller 3210 is configured to exchange signals SGL with the host 3100 through the first signal connector 3250. Here, the signals SGL may include a command, an address, data and the like. The signal connector 3250 may be configured as a connector such as PATA, SATA, SCSI, or SAS, according to the interface method between the host 3100 and the SSD 3200.

Figure 8:
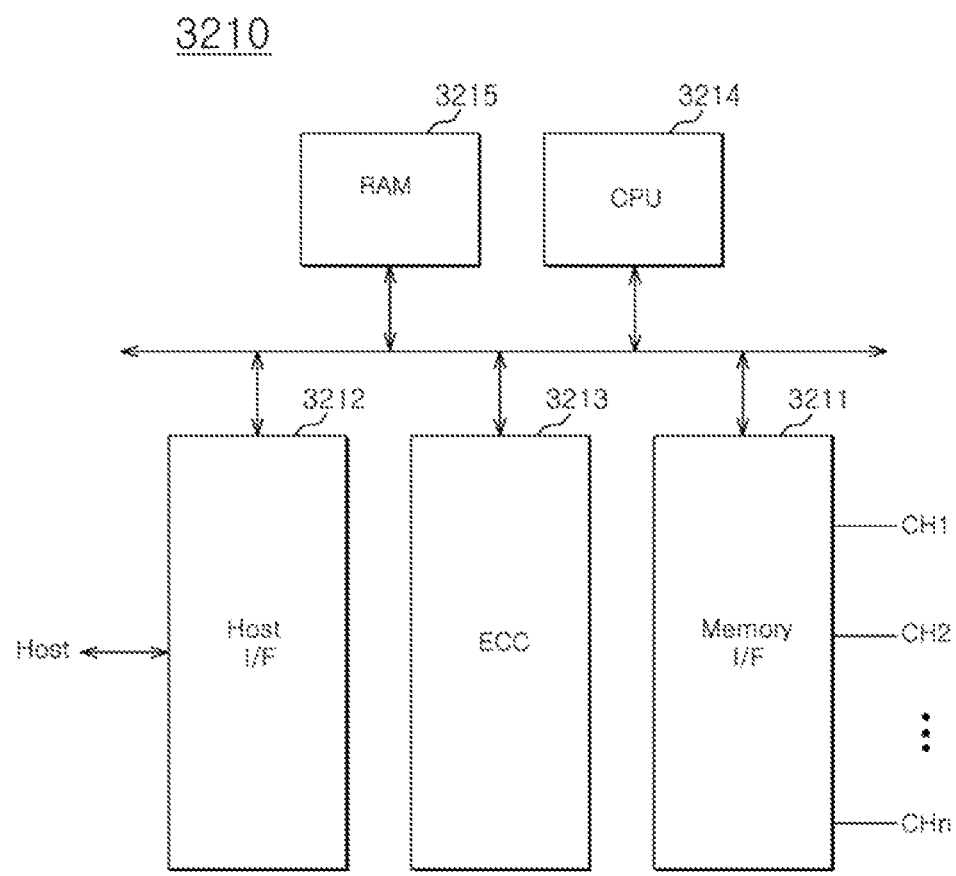
FIG. 8 is a detailed diagram illustrating an SSD controller shown in FIG. 7.

FIG. 8 is a detailed diagram illustrating the SSD controller shown in FIG. 7, Referring to FIG, 8, the SSD controller 3210 includes a memory interface 3211, a host interface 3212, an ECC unit 3213, a CPU 3214, and a RAM 3215.

The memory interface 3211 is configured to provide a command and address to the nonvolatile memory devices 3231 to 323n. Furthermore, the memory interface 3211 is configured to exchange data with the nonvolatile memory devices 3231 to 323n. The memory interface 3211 may scatter data transferred from the buffer memory 3220 over the respective channels CH1 to CHn, according to the control of the CPU 3214. Furthermore, the memo y interface 3211 transmits data read from the nonvolatile memory devices 3231 to 323n to the buffer memory 3220, according to the control of the CPU 3214.

The host interface 3212 is configured to provide an interface with the SSD 3200 in response to the protocol of the host 3100. For example, the host interface 3212 may be configured to communicate with the host 3100 through one of PATA, SATA, SCSI, SAS protocols. Furthermore, the host interface 3212 may perform a disk emulation function of supporting the host 3100 to recognize the SSD 3200 as a hard disk drive (HDD).

The ECC unit 3213 is configured to generate parity bits based on the data transmitted to the nonvolatile memory devices 3231 to 323n. The generated parity bits may be stored in spare areas of the nonvolatile memory devices 3231 to 323n. The ECC unit 3213 is configured to detect an error of data read from the nonvolatile memory devices 3231 to 323n, When the detected error fails within a correction range, the ECC unit 3213 may correct the detected error.

The CPU 3214 is configured to analyze and process a signal SGL inputted from the host 3100. The CPU 3214 may control overall operations of the SSD controller 3210 in response to a request of the host 3100. The CPU 3214 controls the operations of the buffer memory 3220 and the nonvolatile memory devices 3231 to 323n according to the firmware for driving the SSD 3200. The RAM 3215 is used as a working memory device for driving the firmware.

Figure 9:
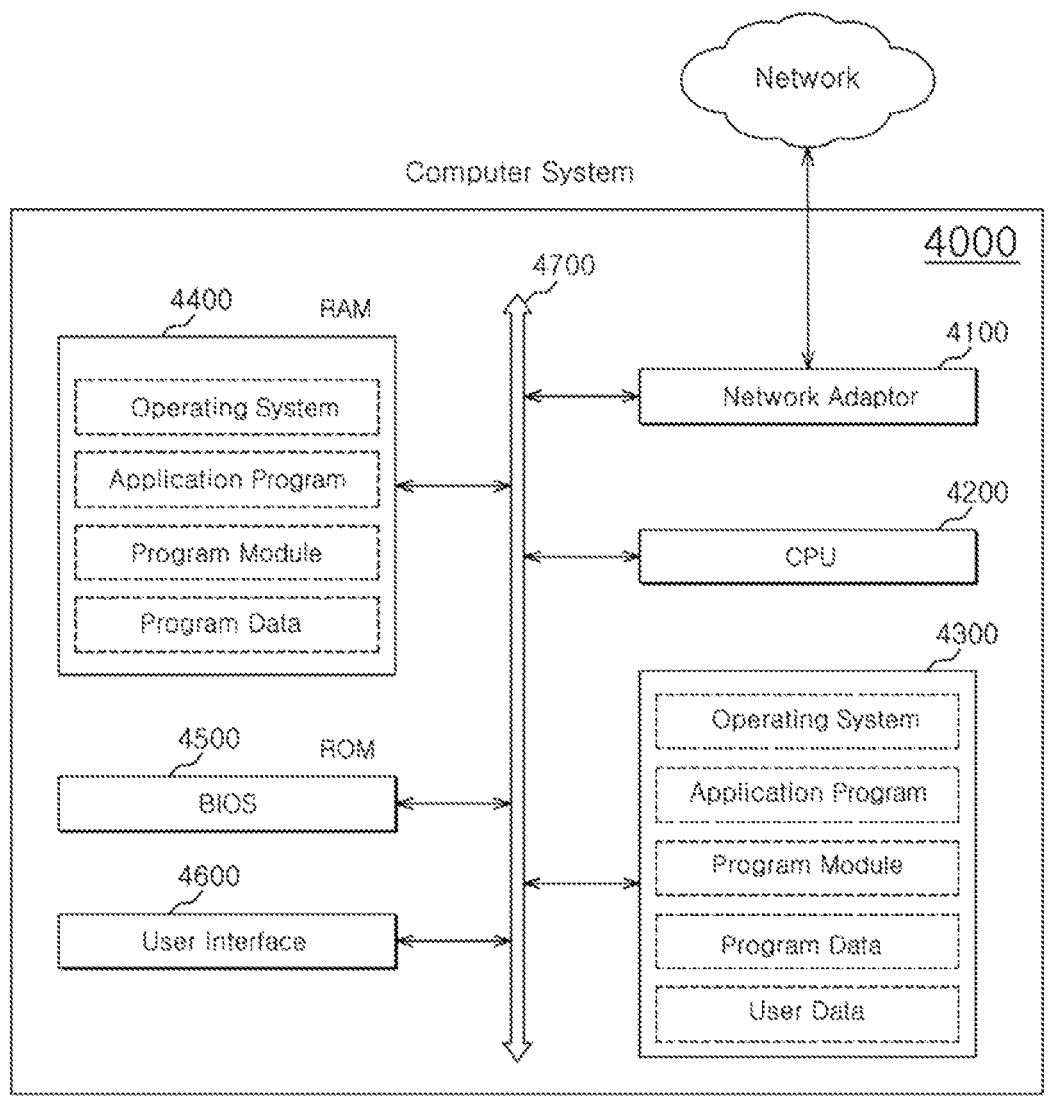
FIG. 9 is a block diagram illustrating a computer system in which the data storage device according to the embodiment of the present invention is mounted.

FIG. 9 is a block diagram illustrating a computer system in which the data storage device according to the embodiment of the present invention is mounted. Referring to FIG, 9, the computer system 4000 includes a network adapter 4100, a CPU 4200, a data storage device 4300, a RAM 4400, a ROM 4500, and a user interface 4600, which are electrically connected to the system bus 4700. The data storage device 4300 may include the data storage device 1200 illustrated in FIG. 6 or the SSD 3200 illustrated in FIG. 7.

The network adapter 4100 is configured to provide an interface between the computer system 4000 and external networks, The CPU 4200 is configured to perform overall arithmetic operations for driving an operating system or application programs in the RAM 4400.

The data storage device 4300 is configured to store overall data required by the computer system 4000. For example, the operating system for driving the computer system 4000, application programs, various program modules, program data, and user data may be stored in the data storage device 4300.

The RAM 4400 may be used as a working memory device of the computer system 4000. During booting, the operating system, application programs, various program modules that are read from the data storage device 4300, and program data required for driving the programs are loaded into the RAM 4400. The ROM 4500 stores a basic input/output system (BIOS), which is enabled before the operating system is driven. Through the user interface 4600, information exchange is performed between the computer system 4000 and a user.

Although not illustrated in the drawing, the computer system 4000 may further include a battery, application chipsets, a camera image processor (CIP) and the like.

According to the embodiment of the present invention, the performance and reliability of the data storage device may be improved.

While certain embodiments have been described above, it will be understood to those skilled in the art that the embodiments described are by way of example only. Accordingly, the data storage device described herein should not be limited based on the described embodiments. Rather, the data storage device described herein should only be limited in light of the claims that follow when taken in conjunction with the above description and accompanying drawings.

What is claimed is:

1. A data storage device comprising:
a data storage medium;
a micro control unit (MCU) connected to a host through a first interface method and configured to control the data storage medium in response to a request of the host;
a buffer memory connected to the host through a second interface method, the buffer memory connected to the MCU and controlled by the MCU and the host;
a first connector configured to directly connect the MCU and the host, and indirectly connect the host and the buffer memory according to the first interface method; and
a second connector configured to directly connect the buffer memory and the host, and indirectly connect the host and MCU according to the second interface method,
wherein the first and second connectors are separate; and
wherein the buffer memory stores management information of firmware driven by the MCU through the second interface method, and the second interface method includes transmitting the management information from the host to the buffer memory under control of the host without intervention of the MCU.

2. The data storage device according to claim 1, wherein the buffer memory buffers data transmitted between the host and the data storage medium according to control of the MCU.

3. The data storage device according to claim 2, wherein the management information comprises one or more of a source code required for driving the firmware, address mapping data for mapping an address provided from the host with an address of the data storage medium, metadata for managing data stored in the data storage medium, and transmission record information of data transmitted from the host.

4. The data storage device according to claim 1, wherein the buffer memory stores data provided from the host or provides data to the host, according to control of the host through the second interface method.

5. The data storage device according to claim 4, wherein the buffer memory stores hot data which are frequently transmitted between the host and the data storage medium in according to the control of the host.

6. The data storage device according to claim 1, wherein the MCU and the host share a part or a whole of the buffer memory.

7. The data storage device according to claim 6, wherein the MCU and the host share the buffer memory according to a priority.

8. The data storage device according to claim 1, wherein the first interface method comprises any one of a PATA interface, a SATA interface, a SCSI interface, a SAS interface, a USB interface, and a card interface.

9. The data storage device according to claim 8, wherein the second interface method comprises a memory interface corresponding to the type of the buffer memory.

10. The data storage device according to claim 1, wherein the data storage medium comprises one or more of nonvolatile memory devices.

11. The data storage device according to claim 1, wherein the buffer memory comprises any one of a volatile memory device and a nonvolatile memory device.

12. A data storage device comprising:
a data storage medium;
a buffer memory configured to buffer data to be stored in the data storage medium or data read from the data storage medium;
a Micro Control Unit (MCU) configured to control the data storage medium and the buffer memory and connected to a host through a first interface method;
a first connector configured to directly connect the MCU and the host, and indirectly connect the host and the buffer memory according to the first interface method; and
a second connector configured to directly connect the buffer memory and the host, and indirectly connect the host and MCU according to the second interface method,
wherein the first and second connectors are separate; and
wherein the buffer memory is connected to the host through the second interface method that is different from the first interface method, shared by the MCU and the host, and accessed by the host without intervention of the MCU; and
wherein the buffer memory stores management information of firmware driven by the MCU through the second interface method, and the second interface method includes transmitting the management information from the host to the buffer memory under control of the host without intervention of the MCU.

13. The data storage device according to claim 12, wherein a part or a whole of the buffer memory is shared by the MCU and the host.

14. The data storage device according to claim 12, wherein the first interface method comprises any one of a PATA interface, a SATA interface, a SCSI interface, a SAS interface, a USB interface, and a card interface.

15. The data storage device according to claim 14, wherein the second interface method comprises a memory interface corresponding to the type of the buffer memory.

16. The data storage device according to claim 12, wherein the buffer memory comprises any one of a volatile memory device and a nonvolatile memory device.

17. The data storage device according to claim 12, wherein the data storage medium comprises one or more nonvolatile memory devices.

18. A solid state drive (SSD) comprising:
a plurality of NAND flash memory devices;
a SSD controller connected to a host through a first interface method and configured to control the plurality of NAND flash memory devices in response to a request of the host;
a non-volatile RAM configured to operate as a buffer memory, connected to the host through a second interface method, the buffer memory connected to the SSD controller and controlled by the SSD controller and the host;
a first connector configured to directly connect the SSD controller and the host, and indirectly connect the host and non-volatile RAM according to the first interface method;
and a second connector configured to directly connect the non-volatile RAM and the host, and indirectly connect the host and SDD controller according to the second interface method,
wherein the first and second connectors are separate; and
wherein the non-volatile RAM stores management information of firmware driven by the SSD controller through the second interface method, and the second interface method includes transmitting the management information from the host to the non-volatile RAM under control of the host without intervention of the SSD controller.

\* \* \* \* \*